(12) United States Patent
Kaul et al.

(10) Patent No.: US 6,786,446 B1
(45) Date of Patent: Sep. 7, 2004

(54) LARGE ROLL DISPENSER

(75) Inventors: Joseph B. Kaul, Lakewood, CO (US); David G. Dunn, Milliken, CO (US)

(73) Assignee: Amcol International Corporation, Arlington Heights, IL (US)

( * ) Notice: Subject to any disclaimer, the term of this patent is extended or adjusted under 35 U.S.C. 154(b) by 203 days.

(21) Appl. No.: 10/056,850

(22) Filed: Jan. 24, 2002

(51) Int. Cl.$^7$ ................................................ B09B 1/00
(52) U.S. Cl. .................... 242/557; 242/564.5; 242/919; 405/129.75
(58) Field of Search .................. 405/129.75, 129.9, 405/302.7; 242/557, 566, 564.5, 595.1, 596.3, 919, 403, 596.1, 596.4, 596.5; 414/24.6, 920

(56) References Cited

U.S. PATENT DOCUMENTS

| | | | |
|---|---|---|---|
| 473,009 A | | 4/1892 | Lyon |
| 1,610,753 A | | 12/1926 | Davis et al. |
| 2,346,948 A | * | 4/1944 | Schackelford et al. ... 242/596.1 |
| 2,393,655 A | | 1/1946 | Robeck |
| 3,056,458 A | | 10/1962 | Gray |
| 3,301,498 A | | 1/1967 | Greding |
| 3,627,301 A | * | 12/1971 | Benson et al. ........... 242/563.1 |
| 3,908,846 A | | 9/1975 | Brummitt |
| 4,025,006 A | | 5/1977 | Turnbow |
| 4,050,972 A | * | 9/1977 | Cardinal, Jr. ............ 242/564.5 |
| 4,060,254 A | | 11/1977 | Ernst |
| 4,084,763 A | * | 4/1978 | Zamboni ................... 242/919 |
| 4,095,706 A | * | 6/1978 | Schwien et al. ......... 242/596.3 |
| 4,165,052 A | * | 8/1979 | Seibert ..................... 242/596.1 |
| 4,179,080 A | * | 12/1979 | Patnaude .................... 242/919 |
| 4,315,700 A | | 2/1982 | Heiligtag et al. |
| 4,555,073 A | * | 11/1985 | Barazone ..................... 242/919 |
| 4,679,743 A | * | 7/1987 | Dallmaier ................ 242/596.1 |
| 4,699,330 A | * | 10/1987 | Barazone .................... 242/557 |
| 4,720,212 A | | 1/1988 | Steenbergen et al. |
| 4,828,432 A | | 5/1989 | Ives |
| 5,181,572 A | | 1/1993 | Andersen et al. |
| 5,215,278 A | * | 6/1993 | Hess .......................... 242/557 |
| 5,304,014 A | | 4/1994 | Slutz |
| 5,346,565 A | | 9/1994 | White |
| 5,437,528 A | * | 8/1995 | Decker ....................... 242/403 |
| 5,536,116 A | | 7/1996 | Lammers et al. |
| 5,685,668 A | | 11/1997 | Justice |
| 5,743,484 A | | 4/1998 | Baskett |
| 5,794,883 A | | 8/1998 | MacEwen |
| 5,988,555 A | * | 11/1999 | Unruh et al. ............... 242/470 |
| 6,264,400 B1 | * | 7/2001 | Gent ...................... 405/129.75 |

* cited by examiner

*Primary Examiner*—Michael Safavi
(74) *Attorney, Agent, or Firm*—Marshall, Gerstein & Borun LLP

(57) ABSTRACT

A heavy roll dispenser is designed to attach to a tractor via a three-point hitch. The base of the dispenser rides above the earth and supports a chassis, which can move left and right via a hydraulic actuator. The chassis has a pair of powered cradle rollers to receive a heavy roll and dispense the heavy roll with the powered cradle rollers. A guide roller is mounted on the chassis behind the cradle rollers. A pair of powered adjustable width pincer arms stabilizes the heavy roll atop the cradle rollers.

6 Claims, 6 Drawing Sheets

LARGE ROLL DISPENSER

FIELD OF INVENTION

The present invention relates to a tractor drawn dispenser for large geosynthetic rolls, which are used to line and cap landfills and other environmentally sensitive areas construction and rubbish ditches.

BACKGROUND OF THE INVENTION

Modern artificial landfills or dumpsites are excavated from sand, gravel, clay and other natural raw materials. Regulatory requirements call for the lining of such landfills to prevent seepage of contaminants into the ground. Once the landfill is full the top of the landfill must also be sealed before landscaping begins. Usually one of the lining is a geosynthetic clay liner (GCL) which comes in a large roll about 12–16.5 feet wide to 135–150 feet long. The roll weighs about 2200 to 3200 pounds.

Prior art systems to lay out the GCL include threading the roll onto a support rod and pulling the rod via a rigid beam and chains. U.S. Pat. No. 6,264,400 B1 (2001) to Gent teaches a three point mounted tractor framework which holds the GCL roll. The roll must be placed on the ground, then the framework must be backed over the roll, then the axle for the roll must be affixed to the framework. Once the roll is installed in the framework, then the tractor can move forward to dispense the roll. Since no power assist is associated with the axle for the roll, some means of anchoring the trailing end must be used to cause the roll to unfurl when the tractor moves forward. Usually two or three men must stand on the trailing end. A telescoping framework can accommodate various width rolls. A hydraulic ram can steer the framework left and right by means of a control stick to adjust the overlap of the GCL liner as it unfurls. The giant roll can walk side to side on the core support bar causing an inaccurate laying of the roll.

The present invention allows loading a heavy roll even on a sloped grade. A fork lift with a stinger bar shown in FIG. 3 or an equivalent can lower the roll onto receiving rollers on a framework, which is attached to a tractor preferably by a three-point hitch. The rollers are powered to automatically unroll the bulk sheet which is also called a blanket. This feature removes the necessity of men standing on a trailing end. In reverse a bulk sheet can be retrieved from the ground. This feature can prevent ruining material in a rainstorm. Side shift control of the roll is handled with a transverse movement of the receiving rollers. The feature maintains the proper alignment of the framework on the three-point hitch. Further side to side control is provided by two anti-travel adjustable alignment arms. Also the present invention eliminates the need for a roll core support bar (also called a core pipe). This core pipe can weigh several hundred pounds.

SUMMARY OF THE INVENTION

The primary aspect of the present invention is to provide a heavy roll dispenser, which allows a top loading of the roll, thereby improving productivity.

Another aspect of the present invention is to provide a powered dispenser and rewind capability to the dispenser with anti-travel alignment arms which also serve to stabilize side to side movement of the roll.

Another aspect of the present invention is to provide a variable width roll capability to the dispenser.

Another aspect of the present invention is to provide a side-to-side shift adjustment mechanism to the dispenser, which maintains a proper alignment of the roll behind the pulling tractor.

Another aspect of the present invention is to eliminate the need for a core pipe in the roll.

Other aspects of this invention will appear from the following description and: appended claims, reference being made to the accompanying drawings forming a part of this specification wherein like reference characters designate corresponding parts in the several views.

A generally rectangular framework has a front face, which connects to a tractor in a standard 3-point hitch configuration. The framework supports a pair of powered receiving rollers upon which a large synthetic roll is placed. The powered rollers can dispense or rewind the roll. The entire powered roller assembly is mounted within the framework on a track, which enables about two feet of side-to-side steerage of the roll as it unfurls. Various width rolls are accommodated using adjustable roller end supports which sandwich the roll between them.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
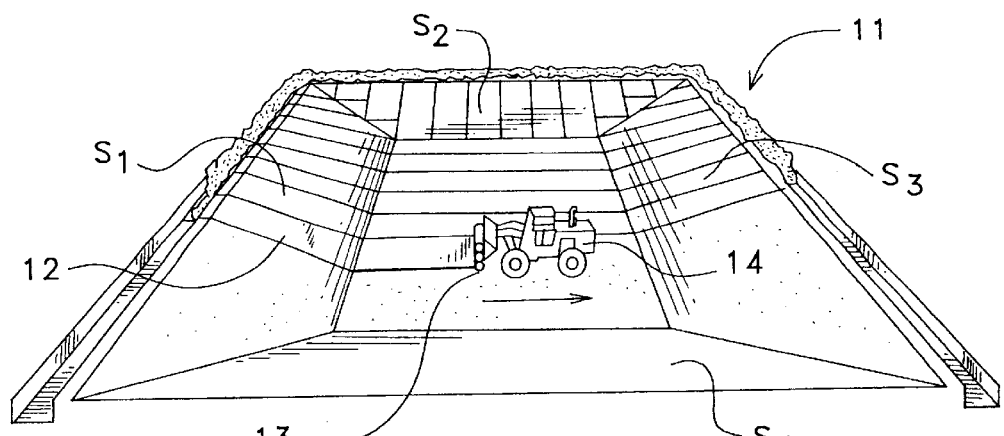
FIG. 1 (prior art) is a top perspective view of a landfill being lined in the known manner using a loader.

FIG. 1 shows a landfill pit 11 being lined in the known manner with the use of a loader 14 operating in reverse in direction A. The roll 13 is laid in strips 12 by the driver. Both with this shovel dragging method and the Gent '400 method, if the roll runs out on a slope $S_1$, $S_2$, $S_3$, $S_4$ then the driver must proceed to a flat portion of ground, usually away from the pit 11 in order to pick up a new roll on level ground. Loading a 3000-pound roll on a slope $S_1$, $S_2$, $S_3$, $S_4$ is dangerous since the heavy roll could take off down the incline. Since the pits 11 are often enormous, the downtime of driving the shovel or tractor away from the pit to re-load on a flat surface is expensive.

Figure 2:
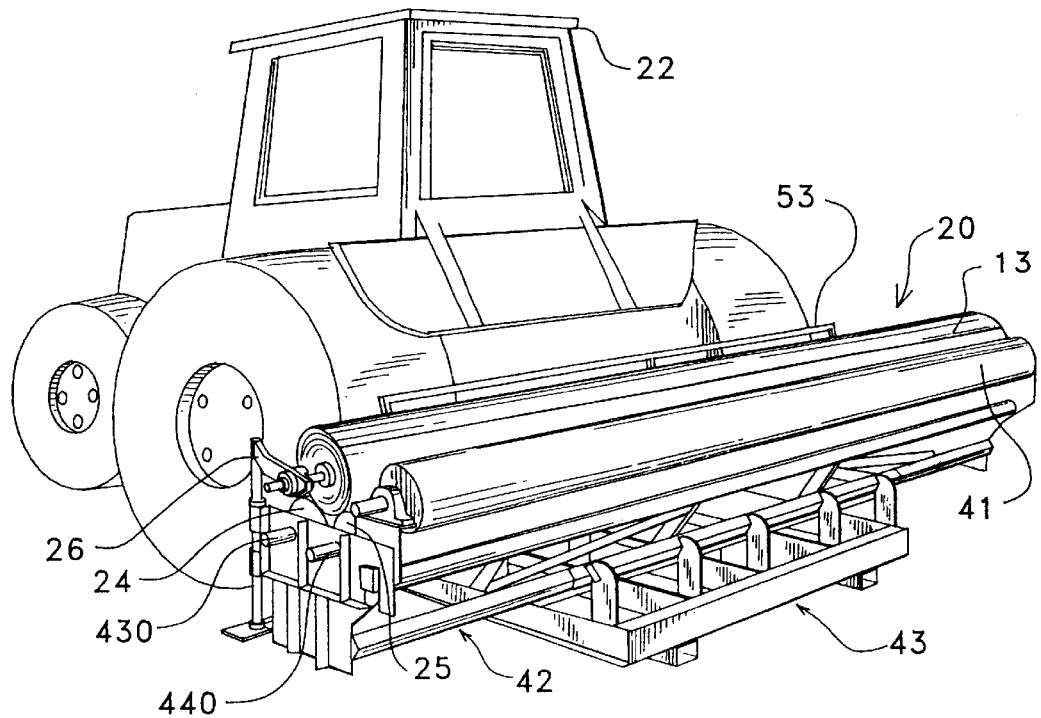
FIG. 2 is a rear perspective view of the preferred embodiment loaded with a roll and attached to a tractor.
Figure 3:
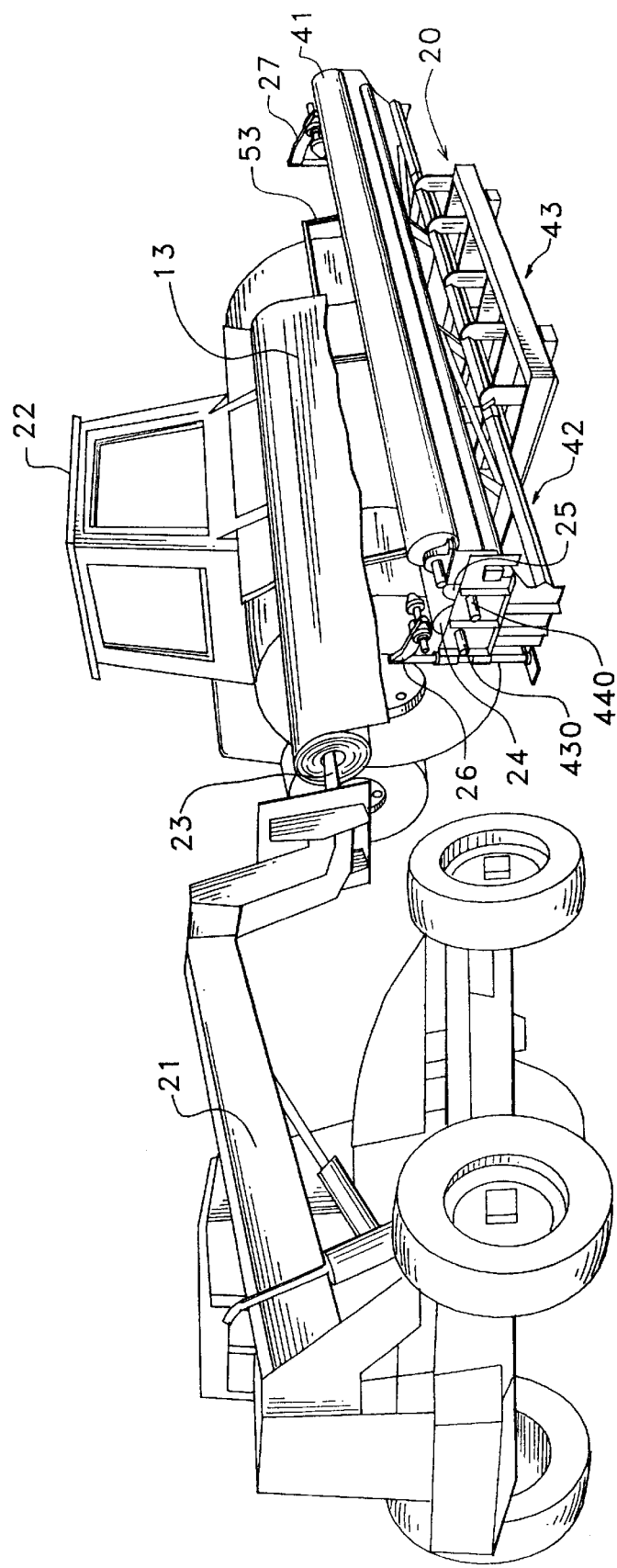
FIG. 3 is the same view as FIG. 2 with the roll being top loaded via a forklift and stinger bar.
Figure 4:
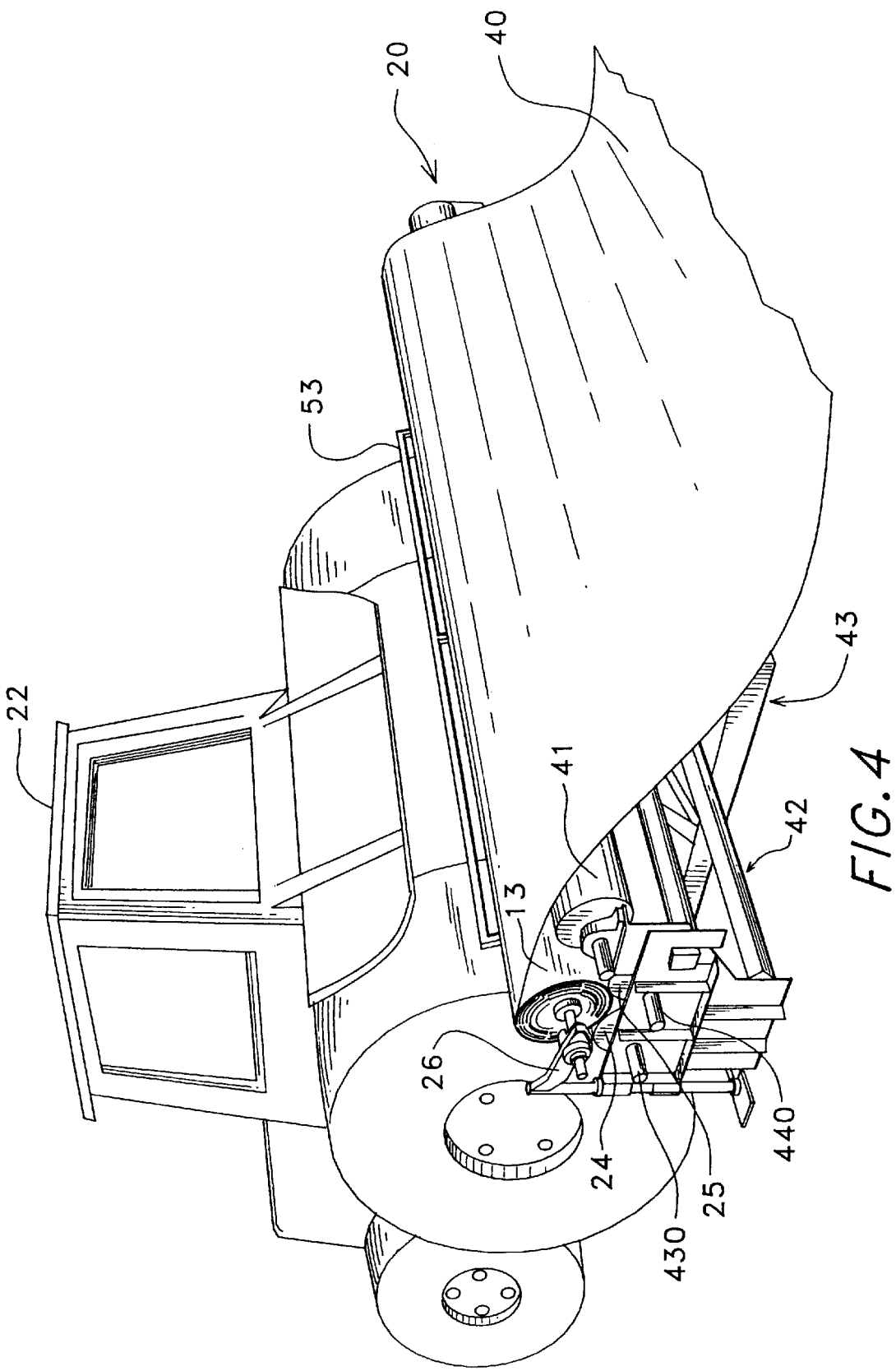
FIG. 4 is the same view as FIG. 2 with the roll feeding off the powered cradle rollers.

Referring next to FIGS. 2,3,4 the top-loading feature of the dispenser 20 is best shown in FIG. 3, a forklift 21 can deliver the roll 13 to the tractor 22 even on an incline. The lifting fork 23 supports the roll 13 until the cradle rollers 24,25 receive the roll. At that time the lifting fork 23 is retracted and the left and right (L and R) adjustable alignment arms 26,27 are moved into place to sandwich the roll 13 atop the cradle rollers 24,25, thus preventing the roll from walking as it is unrolled. Next the cradle rollers 24,25 are powered to unroll a trailing edge 40 of the roll 13 over the guide roller 41.

A chassis 42 supports the cradle rollers 24, 25 via their respective axles 43o, 44o. The chassis can slide left and right under hydraulic power on a base 43. The base 43 hitches to a tractor in a known manner such as a three-point hitch (not shown). Since the cradle rollers 24, 25 are powered, the roll 13 can be unfurled without the necessity of standing workmen on the trailing end 40. Also in a sudden rainstorm a partially unfurled roll can be rewound and covered to protect it from the rain. Most GCL rolls specify unfurling in a dry environment.

Figure 5:
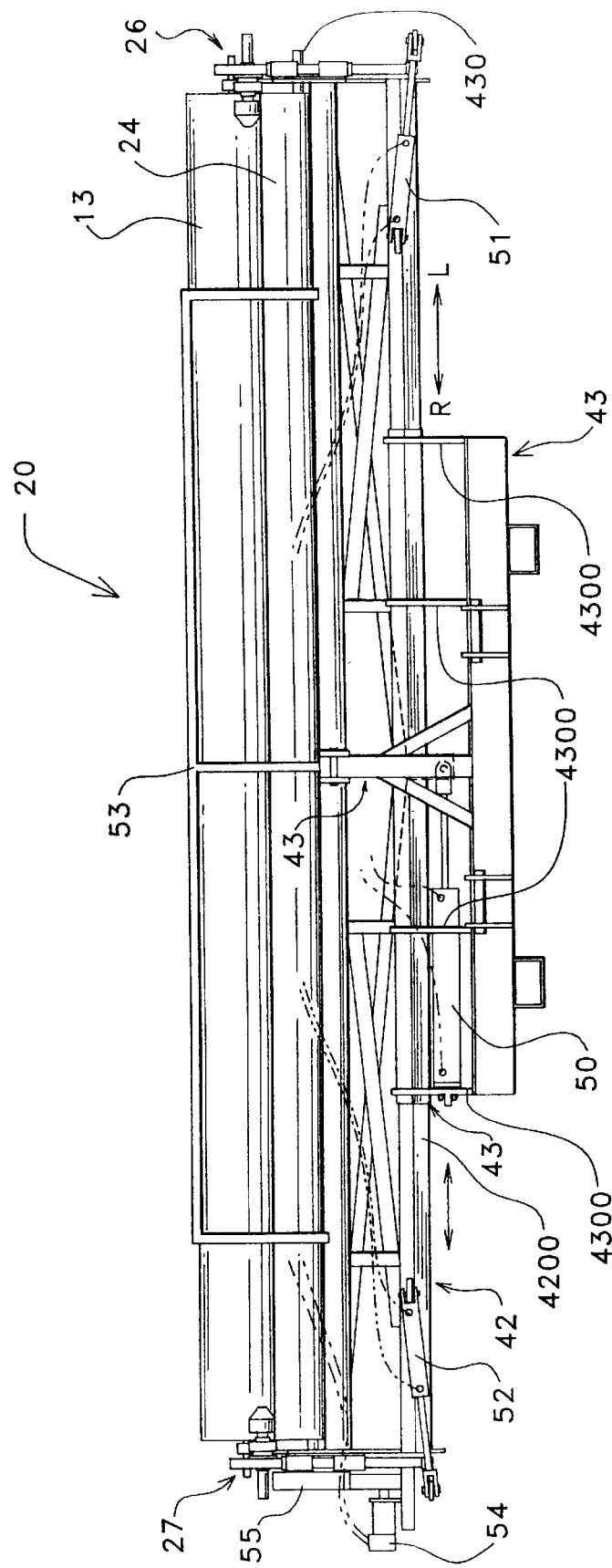
FIG. 5 is a front plan view of the preferred embodiment.

Referring next to FIG. 5 the base 43 has a hydraulic piston 50, which is attached to the chassis 42. While laying the roll 13 the driver can move the chassis 42 left and right (L and R) about a foot relative to the base 43 while the base 43 remains in a constant alignment in the three-point hitch with the tractor 22. All hydraulic lines are shown by dots.

The chassis 42 supports a left hydraulic piston 51 which powers the left support arm 26 and a right hydraulic piston 52, which powers the right support arm 27. A safety rail 53 may be attached to the base 43. A hydraulic motor 54 drives the drive train assembly 55, which powers the cradle rollers 24, 25. Equivalent drive systems would include tractor hydraulics, ground wheel take off mechanism and/or an electric motor.

Figure 6:
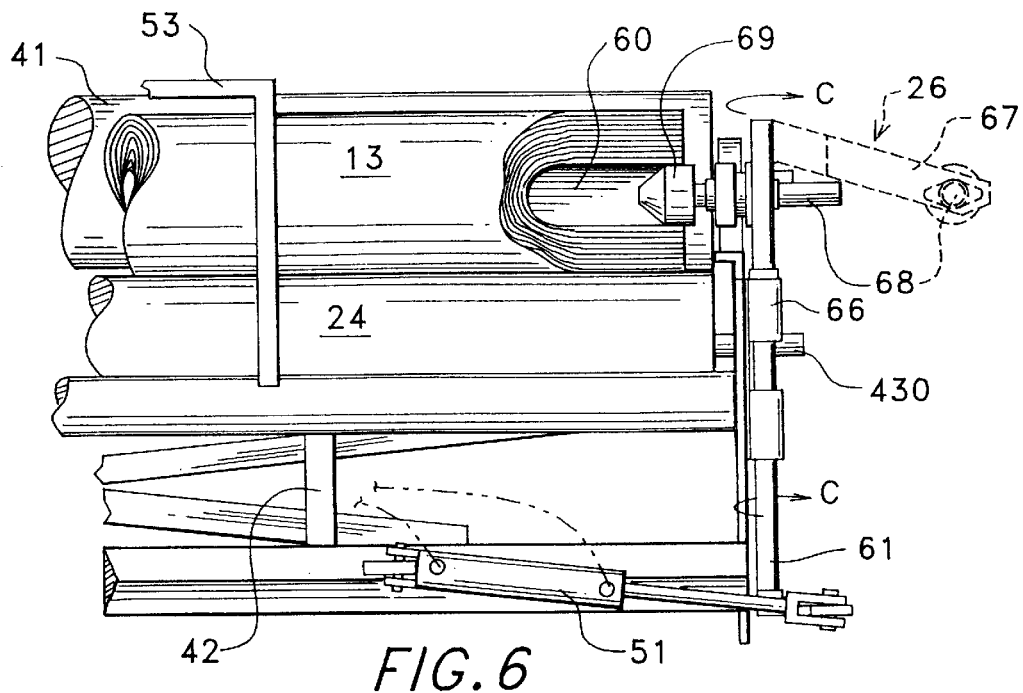
FIG. 6 is a front sectional view with cutaway showing the rotatable roll suspension arm.
Figure 7:
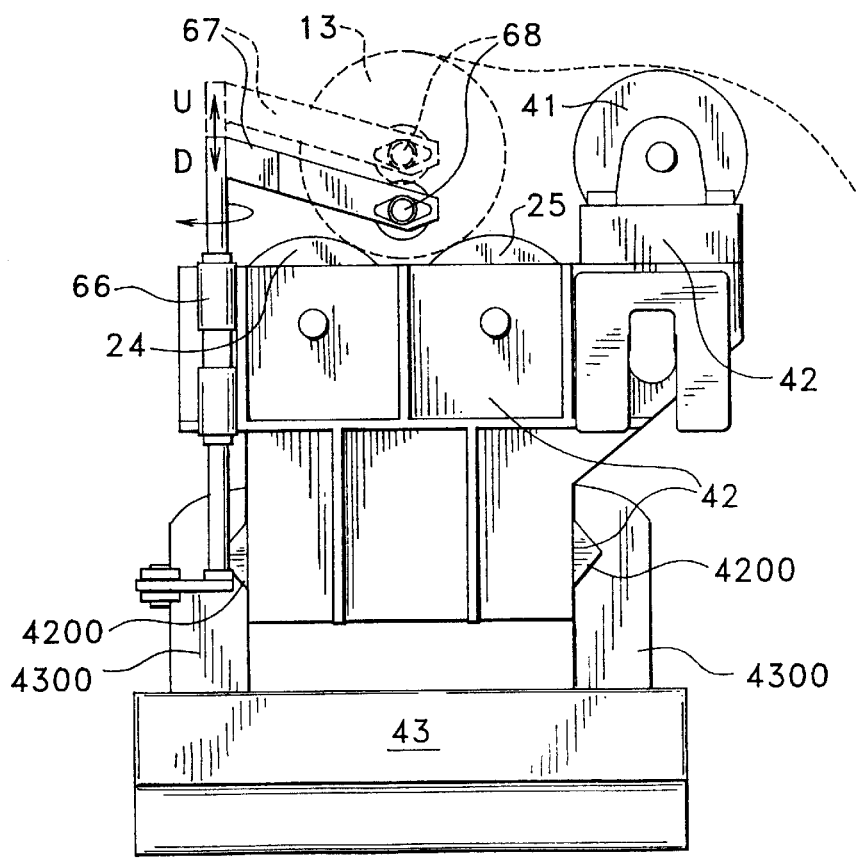
FIG. 7 is a right side plan view of the preferred embodiment showing a roll in dots.

Referring next to FIGS. 5,7 the actual support means between the base 43 and the chassis 42 is shown to be a pair of lateral support rails 4200 mounted to the chassis. These support rails 4200 slide in grooves in vertical posts 4300. Referring next to FIGS. 6,7 the operation of the support arms 26, 27 is shown. Rolls 13 come in various widths. As the roll 13 unfurls it reduces its diameter. Therefore, the support arms 26, 27 must adjust both for adjustable spacing between them and up and down. Telescoping pole 66 travels up and down as shown by arrows V and D in FIG. 7. When a new roll is loaded onto cradle rollers 24, 25 the hydraulic piston 51 is retracted to rotate the telescoping pole 66 clockwise C, thereby moving the brace 67 to the side as shown in dots in FIG. 6. To engage the hollow end 60 of the roll 13, the telescoping pole 66 is rotated counterclockwise as shown in solid lines in FIG. 6. The nose 69 of axle 68 then engages the hollow end 60 of the roll 13.

Figure 9:
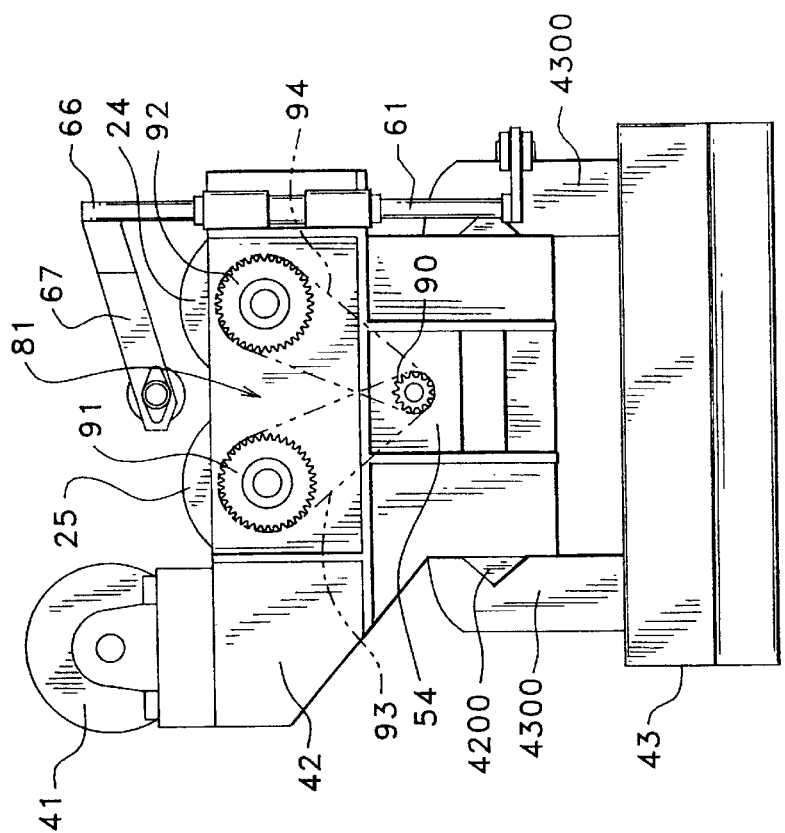
FIG. 9 is the same view as FIG. 8 with the drive assembly cover removed.
Figure 8:
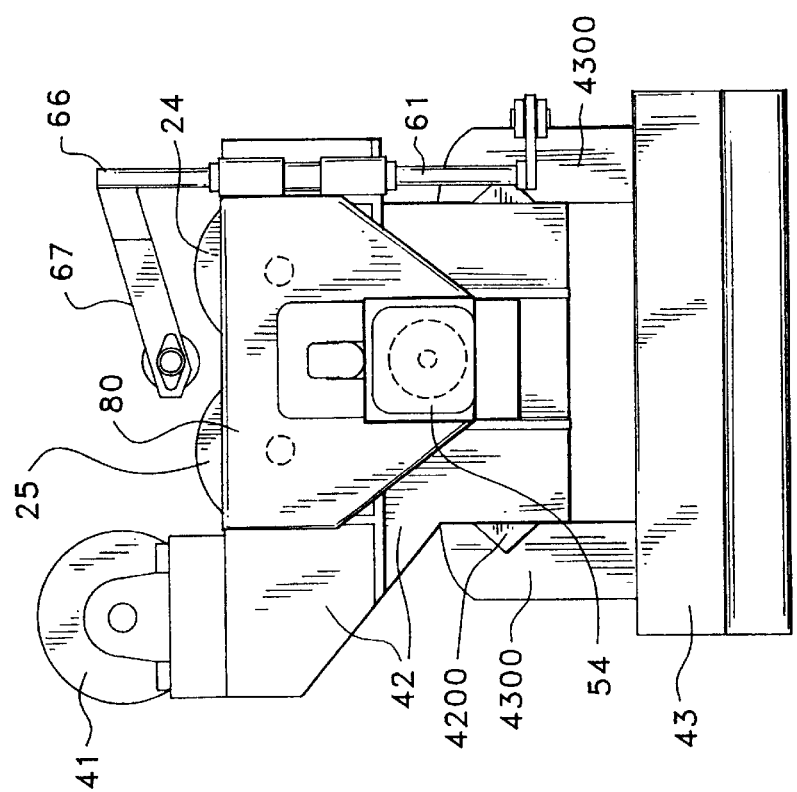
FIG. 8 is a left side plan view showing the outside of the drive assembly for the cradle rollers.

Referring next to FIGS. 8,9 the cover 80 shields the hydraulic motor 54 and the drive train assembly 81. The drive gear 90 rotates clockwise C to drive via chains 93 the cradle roller gears 91,92 clockwise C, thereby unfurling the roll 13 (not shown). Reverse operation is accomplished by reversing the motor 54.

Although the present invention has been described with reference to preferred embodiments, numerous modifications and variations can be made and still the result will come within the scope of the invention. No limitation with respect to the specific embodiments disclosed herein is intended or should be inferred.

We claim:

1. A dispenser for a roll of geosynthetic clay liner material, the dispenser comprising:

a base having a hitch member for a movement by a vehicle;

a chassis having a transverse mounting assembly atop the base, said chassis including a pair of adjustable width alignment arms to sandwich the roll to be dispensed between them;

the chassis supporting a pair of cradle rollers;

a motor to drive at least one member of the pair of cradle rollers thereby dispensing the roll; and wherein the transverse mount assembly further comprises a left hydraulic actuator and a right hydraulic actuator to allow a vehicle driver to adjust a placement of the roll to be dispensed transversely with respect to a direction of travel of said vehicle.

2. The dispenser of claim 1, wherein the chassis further comprises a guide roller.

3. The dispenser of claim 1, further comprising a guide roller located rearward of the pair of cradle rollers.

4. The dispenser of claim 1, wherein the left and right hydraulic actuators are attached to the base.

5. The dispenser of claim 1, wherein each adjustable width alignment arm further comprises an up/down telescoping pole and a hydraulic piston to rotate the telescoping pole, thereby moving a roller brace to a proper position to engage an end of the roll to be dispensed.

6. The dispenser of claim 5, wherein the pair of adjustable width alignment arms each further comprises a powered piston to rotate both telescoping poles, each said telescoping pole having a bracket and a hub for an end of the roll of geosynthetic clay liner.

* * * * *